(12) United States Patent
Stender et al.

(10) Patent No.: US 6,762,243 B2
(45) Date of Patent: Jul. 13, 2004

(54) MULTILAYER COATING SYSTEMS CONTAINING A GEL-LIKE BASE LAYER AND A POLYURETHANE TOPCOAT, AND THEIR PRODUCTION AND USE

(75) Inventors: Adolf Stender, Duderstadt (DE); Claus Kobusch, Shanghai (CN); Wolfram Küttner, Bergisch Gladbach (DE)

(73) Assignees: Bayer Aktiengesellschaft, Leverkusen (DE); TechnogelGmbH & Co., Duderstadt (DE)

( * ) Notice: Subject to any disclaimer, the term of this patent is extended or adjusted under 35 U.S.C. 154(b) by 0 days.

(21) Appl. No.: 09/917,457

(22) Filed: Jul. 27, 2001

(65) Prior Publication Data

US 2002/0123562 A1 Sep. 5, 2002

(30) Foreign Application Priority Data

Jul. 31, 2000 (DE) .......................................... 100 37 157

(51) Int. Cl.$^7$ .............................. C08J 3/00; C08K 3/20; C08L 75/00; B32B 27/00; B05D 3/02
(52) U.S. Cl. ................. 524/590; 427/372.2; 427/385.5; 428/423.1; 524/589
(58) Field of Search .................... 428/423.1; 427/372.2, 427/385.5; 524/589, 590

(56) References Cited

U.S. PATENT DOCUMENTS

| 3,822,238 A | 7/1974 | Blair et al. .................... 260/75 |
| 3,975,350 A | 8/1976 | Hudgin et al. ............. 260/30.4 |
| 4,456,642 A | 6/1984 | Burgdorfer et al. ........... 428/68 |
| 4,466,936 A | 8/1984 | Schapel et al. ............. 264/225 |
| 5,362,834 A | 11/1994 | Schapel et al. ............... 528/58 |

FOREIGN PATENT DOCUMENTS

| CH | 289915 | 4/1954 |
| DE | 23 47 299 | 4/1975 |
| GB | 1 478 000 | 5/1976 |

Primary Examiner—Patrick D. Niland
(74) Attorney, Agent, or Firm—Joseph C. Gil; Thomas W. Roy; Gary F. Matz

(57) ABSTRACT

The present invention relates to a coating system containing

I) anhydrous, gel-like, high molecular weight polyurethane compositions, which may contain active substances, based on
   (1) 15 to 62 wt. %, based on the weight of 1) and 2), of a high molecular weight covalently crosslinked polyurethane matrix and
   (2) 38 to 85 wt. %, based on the weight of 1) and 2), of a liquid dispersing agent firmly bound in the matrix by secondary valence bonds, wherein the liquid dispersing agent contains one or more polyhydroxyl compounds having a number average molecular weight of 1000 to 12000 and an OH number of 20 to 112, wherein the dispersing agent is substantially free from hydroxyl compounds having a molecular weight below 800, and
II) solvent-containing, solvent-free and/or aqueous polyurethane topcoats.

11 Claims, No Drawings

MULTILAYER COATING SYSTEMS CONTAINING A GEL-LIKE BASE LAYER AND A POLYURETHANE TOPCOAT, AND THEIR PRODUCTION AND USE

BACKGROUND OF THE INVENTION

1. Field of the Invention

The present invention relates to a multilayer coating system comprising a thick, gel-like base layer and a topcoat of polyurethane coating, and their production and use (application).

2. Description of the Prior Art

In the automobile industry it is standard practice for, e.g., the instrument panel

- to use an uncoated plastic material (cheap solution with poor optical and haptic properties and poor resistance to environmental influences),
- to apply a composite structure based on polyurethane foam and coating, textile material or leather as decorative layer by means of adhesive bonding (good haptic properties, but high costs due to complicated production),
- subsequently to coat the employed plastic materials, e.g., using a two-component polyurethane-based 50 $\mu$m thin soft-feel coating (average haptic properties, good resistance properties, average price).

This also applies as appropriate to the other areas of use of plastic materials that come into direct contact with human skin. The soft effect of the thin soft-feel coating layers can be enhanced only within certain limits (e.g. by increasing the layer thickness to 100 $\mu$m), and also the resistance properties and optical properties of the coating are generally impaired.

The composite structure based on carrier/foam/coating also has a number of disadvantages:

The production costs are high and accordingly such systems are expensive.

The light-fastness is often not adequate.

The use of plasticizers in the films contributes significantly to fogging.

Anhydrous gel compositions such as those described in EP-A 0 057 838 and EP-A 0 057 839 have become widely available on the market and are manufactured and used according to the processes described in these publications. These applications relate to anhydrous gel compositions, gel compositions with a depôt effect optionally containing active substances, based on a polyurethane matrix and high molecular weight polyols as dispersing agents and optionally active substances, as well as to a process for the production of the gel compositions, optionally in the presence of the active substances. Biocides, pharmaceuticals, ethereal oils, fragrances, coloring agents, cleaning agents, anti-aging agents, lubricants and antistatics, and other materials may be used as active substances. The gel compositions may be employed as casting or pouring compositions or as moldings containing active substances having a depôt effect of the active substances. These gels are used as such and are covered with films or textile materials in order to permit use as a block gel.

Water-based gels have been used for some years in many technical sectors (see for example R. L. Whistler, Industrial Gums, Academic Press, Inc., New York, 1973 and DE-A 347 299). A particularly interesting property of the gels is that they possess a high casting accuracy. This is utilized in order to duplicate moldings. In this case the body to be cast is recast with the gel-forming composition. The molding is removed after the gel formation. A gel mold is obtained whose cavity corresponds to the shape of the molding.

An agar-gel is used as duplicating composition, for example in the dental sector. Such compositions have a number of disadvantages however:

a) the gelling takes a long time and has to be carried out under specific process conditions, b) the elasticity of the gel is not sufficiently high for the demolding of thin crosspieces and undercuts, c) the dimensional stability is unsatisfactory, and d) if the gel mold is kept in the open air the dimensions change even after a very short time as a result of evaporation of water.

Anhydrous casting compositions are also known, for example, based on silicone. They are produced by mixing a prepolymer with a small amount of crosslinking agent. The model to be cast is poured together with this reaction mixture and removed after the mixture has hardened. A mold is obtained having a cavity in which castings of the model can then be produced. Anhydrous casting compositions have the following disadvantages however:

a) too high a viscosity for the casting of very fine depressions and undercuts in the surface of the model, and b) excessive reaction times—reducing the reaction time by increasing the amount of the crosslinking agent results in excessive shrinkage of the mold.

Gel compositions containing active substances with a depôt effect, in which the active substances are released to the surrounding medium over a period of weeks to months, are known for example from U.S. Pat. Nos. 3,822,238 and 3,975,350. Also, it is known from DE-A 25 21 265 that water-containing and/or alcohol-containing polyurethane-polyurea gels can be produced in the presence of fragrances.

Carrier materials based on water-containing gels are described, which may contain a very wide variety of agents, e.g. pharmaceuticals, biocides or fragrances. Such water-based gels have the disadvantage however that many agents, for example biocides, may be relatively rapidly decomposed due to the presence of the water and, thus, the time of effectiveness of these gels, i.e. the depôt effect, is greatly reduced. It is also known to incorporate solid and/or foamed high molecular weight polyurethanes as active substances (CH-A 289 915).

Such high molecular weight polyurethanes have the disadvantage, however, that a large proportion of the incorporated liquid agents remains in the polyurethane as a result of the universally high molecular weight structure and/or too high a proportion of rigid material, and are thus lost for the depôt effect. Solid active agents can be used only to a very limited extent; non-volatile solid substances do not migrate out and highly volatile solid substances can diffuse out only for a very short time and in very small amounts.

EP-A 0 057 838 and EP-A 57 839 describe gels based on polyols that have a high casting accuracy without suffering from the aforementioned disadvantages. These gels are obtained by reacting one or more higher functional, high molecular weight polyols in the presence of catalysts and optionally fillers and additives with organic diisocyanates and/or polyisocyanates at an isocyanate index of about 15–60. The term "isocyanate index" denotes the equivalent ratio (NCO/OH)×100. As has been found, elastic gels according to the invention that are synthesized from a covalently crosslinked polyurethane matrix and one or more polyols rigidly bound therein (i.e. without the danger of an interfering exudation) are obtained only if the isocyanate and polyol components reacting with one another have a certain minimum functionality and if the polyol or polyols are substantially free from fractions with an OH number of more than 112 or with a molecular weight below 800, preferably below 1000.

It was then also found that gel compositions with improved depôt effect, uniform release of active substances, high active substance concentrations, good stability of the active substance additives and good migration ability of the active substances are obtained if active substances are dissolved or dispersed, as additives, in high molecular weight polyols in the polyurethane-forming reaction, and diisocyanates and/or polyisocyanates as well as catalysts and optionally conventional additives are mixed in.

The advantages of these gel compositions is that a high proportion of high molecular weight polyols is present in the only partially crosslinked polyurethane matrix, which permits and regulates the migration and release of the active substances to the outside.

The disadvantage however is the surface of these gels, which is too rubbery and therefore sensitive to dirt, and does not have a good feel (is too tacky) and accordingly has unsatisfactory haptic properties. Either a film or textile material is therefore applied as protective layer. The films are also necessary in order to be able to handle the gel at all. Initially, this is expensive and also permits only a restricted use, or even no use at all of the gel in various applications where this film interferes (for example the central console in automobile interiors).

A coating with an elastic network would be an alternative in this case. It is known to coat plastic substrates produced by injection molding with two-component, conventional (solvent-containing or aqueous) clearcoats or topcoats in a spray process. In this way surface protection can be achieved with a 10–100 μm thin coating. The elasticity of the coating is matched to that of the substrate and is generally in the range <100%. In this connection a distinction should be made between the bending elasticity, which normally specifies the vertical deformability, and the elongation at break, which specifies the horizontal deformability. With the elongation at break the rebound behavior after deformation should also be given, which indicates whether a plastic or elastic deformation has occurred. Plastic coatings or the even harder metallic coatings do not normally exhibit this behavior.

In contrast to the coating of metal parts, plastic substrates are coated with flexible lacquers since hard lacquers would lead to an embrittlement of the overall structure (plastic substrate+lacquer). This could result, for example, at low temperatures in a shattering of the structural part due to crack propagation in the event of a mechanical contact. Flexible plastic coatings generally have elongations at break of about 5–100% and may be loaded in the bending test (bending of a coated Bayflex substrate) down to −20° C. without undergoing crack formation. The rebound behavior is however in most cases only moderate, since the coating has formed a solid polymer network. Also, thermoplastic materials generally have a <5% rebound behavior. However, elastic substrates, such as solid gels, exhibit an intact rebound behavior to the original state even at considerably higher elongation at break values (in some cases >1000%).

In order to protect the surface of gels as indicated above, for example against dirt, scratching, light influences and weathering, as well as against solvents, a coating would be appropriate. However, known flexible plastic coatings are inadequate, especially in two aspects:

the adhesion to elastic substrates capable of recovery (even after weathering) is unsatisfactory; and the elongation at break and rebound behavior of elastic substrates is adversely affected by an insufficiently elastic coating layer (for example, the whole gel can crack or the coating can flake off).

With gels there is also the additional requirement that in many applications the surface should have haptic properties (bicycle saddles, seat cushions, etc.), and at the same time must also be resistant to solvents, chemicals (acids, alkalis, detergents) and weathering. This requirement cannot be met with conventional coatings. For example, the Impranil C solution described in EP-A 057 839 is unsatisfactory as a coating since it does not have adequate resistance to solvents.

An object of the invention is to provide coating systems that do not exhibit the aforementioned disadvantages and which also offer advantages regarding handling and haptic properties (gripping behavior on the surface).

It has now surprisingly been found that in a combination structure having a base layer formed from a high molecular weight, gel-like polyurethane and a topcoat of a polyurethane coating, an overall coating can be obtained that has the desired properties:

high horizontal haptic properties due to the gel-like base layer, high vertical haptic properties due to the topcoat of a polyurethane coating, good resistance to environmental influences imparted by the topcoat, high expandability and at the same time high rebound behavior after both layers have been subjected to pressure and/or tensile stresses.

The present invention relates to a multilayer coating which has a) a base layer of high molecular weight, gel-like polyurethanes and b) a topcoat of a polyurethane coating, and which can be applied to any suitable substrate and can be used in all areas of industrial application where a surface is to be produced that is characterized by outstanding soft effect good resistance to environmental influences simple production and processing and high expandability and rebound capacity (in order to be able to adapt the mechanical properties ideally to all substrates), and that does not have the aforementioned disadvantages, as well as its production and use.

It has also surprisingly been found that the advantages of the gels described in EP-A 0 057 838 and 0 057 839 are not affected by this composite structure but are even improved. The composite structure based on a gel-like polyurethane+ topcoat thus also exhibits all the advantages of the known gels (EP-A 005 739 and EP-A 005 738).

Besides this, there are further advantages:

The gel no longer has to be coated with a film or with a textile material, but is coated subsequently or preferably directly in the mold and can then be applied jointly with the thick-layer gel composition to other substrates.

This permits the production of structural parts in one workstage.

The surface properties are significantly improved (haptic properties, resistances and freedom from dust). The handling is thereby also significantly improved.

Optical effects (specific single shades, metallic colors or high gloss) can be achieved. This was not possible with the previous combination.

Also a completely new use is possible, namely the application of the gel-like polyurethane primer to any suitable substrate by knife coating, spraying, pouring, followed by sealing of the surface with the polyurethane coating.

Similarly novel is then also a sandwich combination consisting of polyurethane coating/gel-like primer/polyurethane coating. This enables films to be produced that are provided on both sides with a surface coating. Composite structures are also possible (for example polyurethane topcoat/polyurethane primer/carrier material/polyurethane primer/polyurethane topcoat).

The present invention accordingly is directed to a) the production and formation of gel-like base layers comparable to EP-A 0 057 838 in a layer thickness of 0.01–100 mm in combination with b) a polyurethane protective layer in a layer thickness of 0.005–2 mm of a solvent-free, solvent-containing or aqueous, highly elastic polyurethane coating. The coatings according to the invention exhibit good elongation and rebound behavior.

SUMMARY OF THE INVENTION

The present invention relates to a coating system containing

I) anhydrous, gel-like, high molecular weight polyurethane compositions, which may contain active substances, based on
   (1) 15 to 62 wt. %, based on the weight of 1) and 2), of a high molecular weight covalently crosslinked polyurethane matrix,
   (2) 38 to 85 wt. %, based on the weight of 1) and 2), of a liquid dispersing agent firmly bound in the matrix by secondary valence bonds, wherein the liquid dispersing agent contains one or more polyhydroxyl compounds having a number average molecular weight of 1000 to 12000 and an OH number of 20 to 112, wherein the dispersing agent is substantially free from hydroxyl compounds having a molecular weight below 800 and
   (3) optionally 0.1 to 100 wt. %, based on the weight of 1) and 2), of fillers, additives and/or catalysts for the polyurethane-forming reaction, wherein optionally 0.1 to 50 wt. % of the additives are active substances, and II) solvent-containing, solvent-free and/or aqueous polyurethane topcoats based on
   a) 0 to 100 wt. %, based on the total weight of the topcoat, of a polyurethane adduct,
   b) 0 to 90 wt. %, based on the total weight of the topcoat, of a flexible polyol having a $T_g$ of −100 to 70° C. and an OH content of 0 to 25 wt. %, based on the total weight of the flexible polyol and
   c) 0 to 60 wt. %, based on the total weight of the topcoat, of a polyisocyanate having an NCO content of 4 to 50 wt. %.

DETAILED DESCRIPTION OF THE INVENTION

The coating systems according to the invention contain

I) anhydrous, gel-like, high molecular weight polyurethane compositions, which may contain active substances, based on
   (1) 15 to 62 wt. %, preferably 20 to 57 wt. %, particularly preferably 25 to 47 wt. %, based on the weight of 1) and 2), of a high molecular weight covalently crosslinked polyurethane,
   (2) 38 to 85 wt. %, preferably 43 to 80 wt. %, particularly preferably 53 to 75 wt. %, based on the weight of 1) and 2), of a liquid dispersing agent firmly bound in the matrix by secondary valence bonds, wherein the liquid dispersing agent contains one or more polyhydroxyl compounds having a number average molecular weight of 1000 to 12000, preferably 1700 to 6000, and an OH number of 20 to 112, preferably 28 to 84, and more preferably 30 to 56, wherein the dispersing agent is substantially free from hydroxyl compounds having a molecular weight below 800, preferably below 1000 and
   (3) optionally 0.1 to 100 wt. %, based on the weight of 1) and 2), of fillers, additives and/or catalysts for the polyurethane-forming reaction, wherein optionally 0.1 to 50 wt. %, preferably 0.5 to 35 wt. %, and more preferably 0.75 to 25 wt. %, of the additives are active substances, and II) solvent-containing, solvent-free and/or aqueous polyurethane topcoats based on
   a) 0 to 100 wt. %, based on the total weight of the topcoat, of a polyurethane adduct
   b) 0 to 90 wt. %, based on the total weight of the topcoat, of a flexible polyol having a $T_g$ of −100 to 70° C. and an OH content of 0 to 25 wt. %, based on the total weight of the flexible polyol,
   c) 0 to 60 wt. %, based on the total weight of the topcoat, of a polyisocyanate having an NCO content of 4 to 50 wt. %.

The high molecular weight matrix according to the invention is the reaction product of one or more polyisocyanates and one or more polyhydroxyl compounds with a number average molecular weight of 1000 to 12000 and an OH number of 20 to 112. Preferably, the mathematical product of the NCO functionality of the polyisocyanates and OH functionality of the polyhydroxyl compounds is at least 5.2.

The dispersing agent according to the invention is preferably based on one or more polyhydroxyl compounds having a number average molecular weight of 1700 to 6000 and an OH number of 28 to 84.

The polyurethane topcoats according to the invention are preferably based on flexible polyols having a Tg of −100 to 25° C. and an OH content of 0 to 25 wt. %, and are preferably crosslinked with polyisocyanates having an NCO content of 4 to 50 wt. %. In order to improve the resistance to chemicals, polyisocyanates with an NCO content of 4 to 50 wt. % may optionally be added in amounts of up to 40% of the total formulation, to the coating systems according to the invention.

Mixing the polyhydroxyl compounds with, for example, polyacrylates in order to improve the resistance to chemicals is also possible according to the invention.

The topcoats used in the coating system according to the invention are prepared from polyurethane topcoat formulations containing up to 150% of fillers (e.g. titanium dioxide), up to 10% of catalysts (such as DBTL), up to 20% of active substances (such as biocides and fragrances), up to 10% of additives (such as flow control agents), up to 5% of light stabilizers (such as Tinuvin 1130, available from Ciba) and optionally dyes, pigments, metal glitter etc.

The coating systems according to the invention are suitable for producing a multilayer coating based on
a gel-like primer with a layer thickness of 30 µm to 10 mm and
a polyurethane topcoat with a layer thickness of 5 µm to 2 mm.

The production of the multilayer coating is carried out by
a) introducing the gel-like primer into a mold by knife application, pouring, spraying or injecting;
b) applying the topcoat by means of knife coating, pouring, spraying or injecting;
c) arbitrarily varying the order of a) and b) by
    first applying the topcoat to the mold wall and then applying the primer;
    first applying the primer and then applying the topcoat to the primer, followed by reaction in a closed or open mold;
    first applying the primer and then applying the topcoat to the mold wall, followed by reaction in a closed mold;
d) introducing the carrier material to be coated into the mold by
e) injection (e.g. plastic materials, thermosetting materials, etc.),
f) insertion (e.g. metal, textile material, wood or finished structural parts),
g) knife application, pouring or spraying (e.g. films, polyurethane coatings or sprayed skins),
h) applying the primer and the topcoat according to the variations described in c) to the carrier material to be coated, hardening the coating, and removing the finished coated structural part from the mold,
i) producing the primer and the topcoat in the mold followed by introducing the carrier material to be coated into the mold, reacting and removing the finished coated structural part.

Different multilayer structures are possible according to the invention, such as:
a) topcoat/primer/topcoat;
b) topcoat/primer/topcoat/carrier (preparation according to a) followed by application to any suitable carrier by the known bonding techniques with for example 1-component or 2-component polyurethane adhesives);
c) topcoat/primer/carrier/primer/topcoat; and
d) carrier 1/primer/topcoat/carrier 2 with carrier 1, for example films, textile material and carrier 2 as arbitrary materials described in 10.

The invention also provides for the use of the polyurethane systems according to the invention for coatings that require a special handling behavior (haptic properties), for example that should exhibit a soft handling behavior (soft-feel haptic property).

The desired haptic properties may be obtained through the content of flexible polyols based on polyester, polyester/polyacrylate or polyacrylate (optionally a mixture of OH-functional and non-functional polyols). The conventional fillers and additives that are used may also influence the haptic properties.

All coating systems according to the invention can be processed by conventional procedures, in particular, the IMC (in-mold coating) process. This process involves the application of the coatings on one or both halves of the mold, the gel-like primer is produced between the mold halves as described in EP-A 005 783, and the complete coating can be removed from the mold and then applied to any suitable carrier (metal, wood, plastics, ceramics, stone, concrete, glass, mineral substrates, etc.).

It is also possible to produce a structural part directly in the mold by:
adding the material to be coated to a mold,
coating a mold half with
mold release agents known from polyurethane chemistry (for example stearate) and
the polyurethane topcoat, followed by drying this coating on the mold surface,
closing the two halves of the mold,
injecting the gel-like primer between the topcoat and the carrier and
removing the complete structural part of carrier/primer/topcoat.

The polyurethane systems according to the invention (primer+topcoat) may be used to produce a very wide range of coating systems. The following combinations in particular may be mentioned:
carrier (wood, metal, glass, ceramics, plastics, rubber, films or polyurethane coating),
gel-like primer (colored, colorless, transparent, fluorescing, containing active substances, releasing active substances, translucent or containing fragrances), and
polyurethane topcoat (colored, colorless, transparent, fluorescing, containing fragrances, translucent, metallic color effect or soft effect).

The present invention also provides a process for producing the coating system according to the invention by preparing
I) substantially anhydrous gel compositions optionally containing active substances, characterized by reacting
    a) one or more diisocyanates and/or polyisocyanates with
    b) one or more polyhydroxyl compounds with a number average molecular weight of 1000 to 12000, and an OH number of 20 to 112,
    c) optionally 0.1 to 50 wt. % of active substances,
    d) optionally catalysts for the reaction between isocyanate and hydroxyl groups, and
    e) optionally known fillers and additives from polyurethane chemistry,
    wherein the isocyanate index is between 15 and 50, the mathematical product of the functionalities of the polyurethane-forming components is at least 5.2 and the polyhydroxyl compounds are substantially free from hydroxyl compounds having a molecular weight below 800, and
II) applying a polyurethane coating to this gel (I) by spraying, knife coating or other application techniques.

In accordance with the invention the topcoat component II) may be applied later, or preferably by application to the wall or walls of the mold in which the gel is produced, followed by gel formation in this mold.

The polyols to be used according to the invention for the gel-like primer are preferably polyhydroxy polyesters, polyhydroxy polyethers, polyhydroxy polythioethers, polyhydroxy polyacetales, polyhydroxy polycarbonates or polyhydroxy polyester amides having the molecular weights, OH numbers and OH functionalities specified above. These polyols are known per se from polyurethane chemistry and are liquid at room temperature or slightly above room temperature.

The hydroxyl group-containing polyesters that may be used include reaction products of polyhydric, preferably dihydric optionally in admixture with trihydric and tetrahydric alcohols, with polybasic, preferably dibasic carboxylic acids. Instead of the free polycarboxylic acids, the corresponding polycarboxylic acid anhydrides or corresponding polycarboxylic acid esters of lower alcohols or their mixtures may also be used to produce the polyesters. The polycarboxylic acids may be aliphatic, cycloaliphatic, aromatic and/or heterocyclic in nature and may optionally be substituted, for example, by halogen atoms, and/or unsaturated.

Examples of suitable polycarboxylic acids and their derivatives include adipic acid, sebacic acid, phthalic acid, phthalic anhydride, tetrahydrophthalic anhydride, hexahydrophthalic anhydride, isophthalic acid, trimellitic acid, maleic anhydride, dimerized and trimerized unsaturated fatty acids, dimethyl terephthalate and terephthalic acid bis-glycol ester.

Suitable polyhydric alcohols include ethylene glycol, propylene glycol, butanediol-1,4 and/or -2,3, hexanediol-1, 6, neopentyl glycol, 1,4-bis-hydroxy-methlcyclohexane, 2-methyl-1,3-propanediol, glycerol, trimethylolpropane, hexanetriol-1,2,6, pentaerythritol, quinitol, mannitol, sorbitol, formitol, methyl glycoside and di-, tri-, tetra- and higher polyethylene, polypropylene and polybutylene glycols.

The polyesters may contain a portion of terminal carboxyl groups. Polyesters of lactones, e.g. $\epsilon$-caprolactone or hydroxycarboxylic acids (such as 8-hydroxy-carboxylic acids, for example, hydroxycaproic acid) may also be used.

Suitable polyether polyols containing at least 2, preferably 2 to 8 and more preferably 2 to 3 hydroxyl groups are known and are produced for example by homopolymerization of epoxides such as ethylene oxide, propylene oxide, butylene oxide, tetrahydrofuran, styrene oxide or epichlorohydrin, for example in the presence of Lewis catalysts, or by addition of these epoxides, preferably ethylene oxide and propylene oxide, optionally as a mixture or in succession, to starting components having reactive hydrogen atoms. Examples include water, alcohols, ammonia or amines, such as ethylene glycol, propylene glycol, diethylene glycol, diethylolpropane, glycerol, sorbitol, sucrose, formitol, formose, 1-(4,4'-dihydroxydiphenyl)propane, aniline, ethylenediamine or ethanolamine.

Polythioethers, polybutadienes, polyacetals, polycarbonates or polyester amides containing OH groups may also be used as starting products. Also suitable are polyhydroxyl compounds already containing urethane and/or urea groups, as well as optionally modified natural polyols such as castor oil.

Polyhydroxyl compounds that contain high molecular weight polyadducts and/or polycondensates or polymers in finely dispersed or dissolved form may optionally also be used according to the invention. These polyhydroxyl compounds may be obtained by carrying out polyaddition reactions (e.g. reactions between polyisocyanates and amino-functional compounds) or polycondensation reactions (e.g. between formaldehyde and phenols and/or amines) in situ in the hydroxyl group-containing compounds mentioned above.

The polyhydroxyl compounds modified by vinyl polymers, such as those obtained by the polymerization of styrene and/or acrylonitrile in the presence of polyethers or polycarbonate polyols, are also suitable for the process according to the invention.

Examples of the aforementioned high molecular weight polyhydroxyl compounds to be used according to the invention are listed in High Polymers, Vol. XVI, "Polyurethanes, Chemistry and Technology", edited by Saunders—Frisch, Interscience Publishers, New York, London, Vol. I, 1962, pp. 32–42 and pp. 44–54 and Vol. II, 1964, pp. 5–6 and 198–199, and also in Kunststoff-Handbuch, Vol. VII, Vieweg-Höchtlen, Carl-Hanser-Verlag, Munich, 1966, for example on pages 45 to 71, as well as in DE-A 29 20 501, pp. 17 to 24. Obviously mixtures of the aforementioned compounds, for example mixtures of polyethers and polyesters, may be used.

Polyhydroxyl polyethers containing 2 to 6, more preferably 2 to 3 hydroxyl groups in the molecule and having a statistically or segmentally incorporated ethylene oxide content of at least 10 wt. %, preferably more than 15 wt. % and most preferably at least 20 wt. %, are preferably used as high molecular weight polyols according to the invention. Most preferred are polypropylene ether polyols with at least 20 wt. % of ethylene oxide, in which at least 15 wt. % of the terminal OH groups are primary hydroxyl groups.

The content of polyols in the gel-forming mixture to be used according to the invention is about 80 to 99 wt. %, preferably about 85 to 98 wt. %, based on the total weight of the gel-forming mixture of polyurethane starting components.

The following compounds may be mentioned as examples of flexible, solvent-containing, solvent-free or aqueous polyols for the polyurethane topcoat that are suitable according to the invention:

1) linear polyester polyols with an OH content of 1 to 25 wt. % and a viscosity of 100 to 5000 mPa·s, such as Desmophen 670, Desmophen VP LS 2328 or Bayhydrol PT 241 (all available from Bayer);
2) hydroxy-functional polycarbonate-polyesters with an OH content of 1 to 10 wt. % and a viscosity of 1500 to 10000 mPa·s, such as Desmophen VP LS 2236 and Desmophen C 200 (both available from Bayer);
3) PES/PAC dispersions such as Bayhydrol VP LS 2058 (available from Bayer);
4) polyether polyols with an OH content of 1 to 25 wt. % and a viscosity of 100 to 3000 mPa·s, such as Desmophen 550U (available from Bayer); and
5) polyurethane adducts with a viscosity of 100 to 55000 mPa·s, such as Impranil C, Desmolac 4340 (for example based on IPDI, HDI, W, NTI) or Bayhydrol DLN (all available from Bayer).

In principle all elastic polyols having a suitable elongation and rebound behavior are suitable.

It has been found by experience that flexible polyols have a poorer resistance to solvents, chemicals, outdoor weathering and short-term weathering than comparably brittle polyols based on polyesters or polyacrylates.

Mixtures of flexible and brittle polyols may be used for the production of the polyol component according to the invention.

The following may be mentioned as examples of solvent-containing, solvent-free or aqueous polyols for improving the resistance properties that are suitable according to the invention:

1) hydroxyfunctional polyester polyacrylates with an OH content of 1 to 22 wt. % and a viscosity of 1000 to 5000 mPa·s, such as Desmophen Laborprodukt TIK 294 and Bayhydrol VP LS 2290 (both available from Bayer);
2) low viscosity polyacrylate polyols/polymethacrylate polyols with an OH content of 1 to 23 wt. % and a viscosity of 700 to 1500 mPa·s, such as Desmophen Laborprodukt TIK 507 and Desmophen Laborprodukt TIK 516 and Bayhydrol VP LS 2235/1 (all available from Bayer); and 3) branched polyester polyols with an OH content of 12 to 20 wt. % and a viscosity of 1000 to 4000 mPa·s, such as Desmophen VP LS 2249/1 (available from Bayer).

Unless otherwise stated the same conditions apply for polyols as in the descriptions of the polyols for the polyurethane primer above.

The organic diisocyanates and/or polyisocyanates to be used in the gel-like primers according to the invention are the aliphatic, cycloaliphatic, araliphatic, aromatic and heterocyclic diisocyanates and/or polyisocyanates known from polyurethane chemistry, such as those described by W. Siefken in Justus Liebigs Annalen der Chemie, 562, pp. 75 to 136. The diisocyanates may be used as monomers or may be used to prepare polyisocyanates containing biuret, allophanate, carbodiimide, isocyanurate and/or urethane groups. Examples include 1,6-hexa-methylene diisocyanate, 1,12-dodecane diisocyanate, cyclobutane-1,3-diisocyanate, cyclohexane-1,3- and cyclohexane-1,4-diisocyanate and mixtures of these position isomers and/or stereoisomers, 1-isocyanato-3,3,5-trimethyl-5-isocyanatomethylcyclohexane, 2,4- and/or 2,6-hexa-hydrotoluylene diisocyanate, hexahydro-1,3- and/or hexahydro-1,4-phenylene diisocyanate, perhydro-2,4'- and/or -4,4'-diphenylmethane diisocyanate, and mixtures of these position isomers and/or stereo-isomers, 1,3- and 1,4-phenylene diisocyanate, 2,4- and/or 2,6-toluylene diisocyanate, diphenylmethane-2,4'- and/or diphenylmethane-4,4'-diisocyanate and naphthylene-1,5-diisocyanate.

Other examples of suitable isocyanates include triphenylmethane-4,4',4"-triisocyanate, polyphenyl-polymethylene polyisocyanates obtained by aniline-formaldehyde condensation followed by phosgenation, and p-isocyanatophenylsulfonyl isocyanates, perchlorinated arylpolyisocyanates, carbodiimide group-containing polyisocyanates, norbornane diisocyanates, allophanate group-containing polyisocyanates, isocyanurate group-containing polyisocyanates, urethane group-containing polyisocyanates, polyisocyanates containing acylated urea groups, biuret group-containing polyisocyanates, polyisocyanates produced by telomerization reactions, ester group-containing polyisocyanates, reaction products of the aforementioned isocyanates with acetals, and polyisocyanates containing polymeric fatty acid esters. These polyisocyanates suitable for the reaction are described in detail in EP-A 0 057 839 (U.S. Pat. Nos. 4,404,296 and 4,466,396, the disclosures of which are herein incorporated by reference).

Preferred aromatic diisocyanates and triisocyanates are 2,4- and/or 2,6-toluylene diisocyanate, and 4,4'- and/or 2,4'-diphenylmethane diisocyanate and their higher homologs, as well as their multifunctional derivatives or trimerization products produced with trihydric and tetrahydric polyols.

Preferred polyisocyanates include 1,6-hexamethylene diisocyanate, isophorone diisocyanate, methylcyclohexane-2,4- and/or methylcyclohexane-2,6-diisocyanate, dicyclohexylmethane-2,4'- and/or dicyclohexylmethane-4, 4'-diisocyanates and derivatives thereof containing biuret, allophanate and/or isocyanurate groups.

All suitable are mixtures of the preceding diisocyanates and/or polyisocyanates. The content of diisocyanates and/or polyisocyanates in the gel-forming mixtures of polyols and polyisocyanates is 1 to 20 wt. %, preferably 2 to 15 wt. %, based on the total weight of the mixture.

The catalysts to be used for the reaction between hydroxyl groups and isocyanate groups in the gel formation are those known from polyurethane chemistry, such as triethylamine, N-tetramethylenediamine, 1,4-diaza-bicyclo-(2,2,2)-octane, N,N-dimethylbenzylamine, X-methyl-K1-dimethylaminoethyl piperazine, pentamethyidiethylenetri-amine. Other examples include the known Mannich bases formed from secondary amines such as dimethylamine, and aldehydes (formaldehyde) or ketones (acetone) and phenols, as well as silamines with carbon-silicon bonds, for example 2,2,4-trimethyl-2-silamorpholine and 1,3-diethylaminomethyltetra-methyl-disiloxane.

According to the invention organometallic compounds, in particular organotin compounds may also be used as catalysts. Examples include tin-(II)-acetate, tin-(II)ethylhexoate and tin-(IV) compounds, for example dibutyltin dichloride, dibutyltin dilaurate and dibutyltin maleate. Further suitable catalysts are described in DE-A 29 20 501 on p. 29, line 5, to p. 31, line 25.

The catalysts are preferably used in an amount of between 0.01 and 10 wt. %, based on the total weight of the gel. The catalysts may also be used in the form of mixtures.

The active substances, fillers and additives described in EP-A 0 057 389 (U.S. Pat. Nos. 4,404,296 and 4,466,936, the disclosures of which are herein incorporated by reference) may also be used according to the invention.

In the hardener component according to the invention for the topcoat, there are preferably used low viscosity, aliphatic polyisocyanates prepared from 1,6-hexamethylene diisocyanate (HDI), 4,4'-diisocyanatodicyclohexylmethane (W), triisocyanatononane (NTI, TIN) or isophorone diisocyanate (IPDI), which may be employed individually or in combination. If the aliphatic polyisocyanates do not have to exhibit light-fastness, then the known aromatic polyisocyanates may also be used (for example MDI or TDI).

The following may be mentioned as examples of polyisocyanates for sole use according to the invention or for use in combinations according to the invention (solvent-containing, solvent-free or aqueous systems) in component II:

1) low viscosity polyisocyanates based on biurets of HDI with a content of 15 to 24 wt. % and a viscosity of 100 to 4000 mPa·s, such as Desmodur N 75 and Desmodur N 3200;

2) low viscosity trimers of HDI, which may also contain allophanate and/or uretdione groups, with an NCO content of 12 to 25 wt. % and a viscosity of 100 to 4000 mPa·s, such as Desmodur VP LS 2102, Desmodur N 3300, Desmodur N 3400, Desmodur N 3600 or Bayhydur 3100;

3) flexible polyisocyanates with an NCO content of 4 to 25 wt. % and a viscosity of 1000 to 10000 mPa·s, such as Desmodur VP LS 2010/1 or Bayhydur VP LS 2306;

4) triisocyanatononane with an NCO content of 48 to 52 wt. % and a viscosity of 10 to 100 mPa·s;

5) mixtures of trimers of IPDI and trimers and/or the uretdione of HDI with an NCO content of 15 to 22 wt. % and a viscosity of 1000 to 5000 mPa·s;

6) polyisocyanates based on $H_{12}$-MDI with an NCO content of 10 to 33 wt. % and a viscosity of 20 to 10000 mPa·s, such as Desmodur W;

7) blocked polyisocyanates such as Desmodur VP LS 2253 or Desmodur VP LS 2307; and 8) the polyisocyanates as described above for the polyurethane primer.

The coatings produced from the polyurethane systems according to the invention are colored using the pigments and fillers conventionally used for lacquer production. Particularly suitable are inorganic pigments based on iron oxide (e.g. Bayferrox 318M) or titanium dioxide (e.g. Tronox RKB-4). All known color effect pigments may also be used.

As catalyst for the production of the topcoats from the polyurethane systems according to the invention, there are used the known substances employed for two-component polyurethane systems, such as organic compounds of tin (e.g. dibutyltin dilaurate or dibutyltin diacetate) or organic compounds of zinc (e.g. zinc octoate). The amount of the catalyst varies depending on the system that is used, the required reaction time and the nature of the catalyst, and is between 0.01 and 3.0 wt. %, based on the resin fraction of the system.

Several methods may be used to process the systems according to the invention. The described systems may be applied by knife coating, pouring or spraying onto any suitable substrate or in any suitable mold, and depending on the coating composition are dried at room temperature or under forced conditions, for example for 10–30 minutes at 60–120° C.

After the films have hardened highly elastic coatings are obtained (elongation up to more than 600%) with good rebound properties. The other film properties satisfy at least the known standards in conventional polyurethane chemistry.

The production of the gel primer according to the invention and containing active substances may be carried out continuously or batchwise. The procedure depends on several factors, such as the shape that is to be imparted to the gels according to the invention depending upon their use. The one-shot or the prepolymer process may be employed.

In the one-shot process all components, i.e. polyols, diisocyanates and/or polyisocyanates, active substances, catalysts and optionally further fillers and additives are added at one time and intensively mixed with one another, the active substances preferably being dissolved or dispersed in the polyol components.

In the prepolymer process two procedures are possible. Either an isocyanate prepolymer is first produced by reacting a corresponding a portion of the polyol amount (+active substance) and the total amount of isocyanate intended for the gel formation, and then adding the remaining amount of polyol (optionally with further active substances), and optionally fillers and additives, to the prepolymer obtained. Alternatively, they made be prepared by adding and intensively mixing and reacting the whole, or the total amount of polyol (+active substance) intended for the gel formation with part of the polyisocyanate amount to form an OH prepolymer, and then mixing in the remaining amount of polyisocyanate.

A particularly advantageous procedure according to the invention is a variant of the one-step process and the OH-prepolymer process. In this case the polyol or polyol mixture, the active substances, optionally the fillers and additives, the catalyst and two different diisocyanates are combined in one shot and intensively mixed, one diisocyanate or polyisocyanate being aromatic in nature and one diisocyanate and/or polyisocyanate being aliphatic in nature. It may be assumed that, due to the markedly different reactivity of the two polyisocyanates, a hydroxyl prepolymer is first formed, which then reacts within a few minutes with the other polyisocyanate with gel formation. Gels with a particularly high toughness are thereby obtained.

In these procedures the conveying, metering in and mixing of the individual components or component mixtures may be performed using known equipment from polyurethane chemistry.

If for example moldings are to be produced for direct use, then the batch procedure is preferred. If however the polyurethane gel according to the invention is to be produced in unit pieces of suitable dimensions, then a continuous procedure is often more favorable. In this case an endless film or sheet is first produced, which can then be cut up into individual pieces and coated.

With continuous production the gellable mixture optionally containing active substances can also be sprayed, poured or knife coated before it has solidified due to gel formation. The gellable mixture containing active substances can be applied to a very wide variety of materials based on natural or synthetic raw materials, for example mats, fleece, knitted fabrics, hosiery, expanded films, plastics films or sheets, or may be cast in desired shapes.

The invention also provides for the use of the coatings systems according to the invention in an IMC (in-mold coating) process.

In the IMC process component II)
a) is applied (by spraying, knife coating, brush application, etc.) to one or both halves of the mold (depending on the arrangement and articles to be formed) and is gently dried (preferably at room temperature or slightly elevated temperatures); component I) is then added to the mold by the methods described above and hardened together with the component II); and subsequently the coated molding is removed from the mold, or
b) is injected after the production of the component I) into a defined gap in the mold (preferably only in the solvent-free embodiment) and is then hardened together with component I), and
c) the composite produced from a) and b) is then applied to the object to be coated.

In a particular embodiment the objects to be coated may also be introduced into a mold and then coated according to the invention.

The conditions during the gel formation can also be varied so that either compact or foamed gels are obtained. If for example air is injected into the gellable mixture, then foamed gels are obtained.

Objects can also be molded according to the invention, for example by decanting the body to be molded together with a gel-forming composition and removing the molding after the gel formation.

According to the invention multilayer coatings can be produced from
a gel-like primer with a layer thickness of 30 $\mu$m to 10 mm, and
a topcoat of polyurethane coating with a layer thickness of 5 $\mu$m to 2 mm.

Multilayer coatings can be produced using the coating systems according to the invention by the following steps, the order of which is not fixed:
a) addition of the gel-like primer to a mold by knife coating, pouring, spraying or injecting,
b) application of the topcoat by knife coating, pouring, spraying or injecting,
c) wherein a) and b) may be varied as follows as regards order
initially by application of the topcoat to the mold wall and then addition of the primer,
initially by addition of the primer and then application of the topcoat to the primer and reaction in a closed or open mold,
initially by addition of the primer and then application of the topcoat to the mold wall and reaction in a closed mold, d) introduction of the carrier material to be coated into the mold by
e) injection (e.g. plastics materials, thermoplastics, etc.)
f) application (e.g. to metals, textiles, wood, finished structural parts),
g) knife coating, pouring, spraying (e.g. films, polyurethane coating, sprayed skins),
h) application of the primer and topcoat with the variations described in a) and b) to the carrier material to be coated, hardening of the coating and removal of the finished coated structural part from the mold,
i) production of the primer and topcoat in the mold followed by introduction of the carrier material to be coated into the mold, reaction, and removal of the finished coated structural component. Multilayer structures of different composite construction may be produced within the scope of the invention, for example
  a) topcoat/primer/topcoat,
  b) topcoat/primer/topcoat/carrier, followed by application to the carrier using bonding techniques with, for example, one-component or two-component polyurethane adhesives,
  c) topcoat/primer/carrier/primer/topcoat,
  d) carrier 1/primer/topcoat/carrier 2 together with carrier 1 such as films, textile materials and carrier 2 as in arbitrary materials described in 10.

The coating systems according to the invention are suitable for coating a very wide variety of substrates of widely varying geometrical shapes, such as smooth flat surfaces, films, sheet materials, hollow bodies (external and internal), etc. The substrates to be coated may consist of different materials as well as of composite materials, such as stone, mineral substances, glass, plastics, wood, metals, semi-metals (e.g. Si), fibrous substances and pressed substrates.

The coatings according to the invention are furthermore suitable for the accurate forming of models from a very wide variety of materials, such as gypsum, wood, concrete, steel, plastics such as epoxides or polyurethanes, stone, ceramics or metals such as copper and iron, as well as for producing artificial bones, joints, dental plates and dentures. These articles are then provided with a multilayer coating.

The invention is further illustrated but is not intended to be limited by the following examples in which all parts and percentages are by weight unless otherwise specified.

EXAMPLES

Examples of polyurethane topcoat

Formulation 1

| | | |
|---|---|---|
| A) | Desmophen 670, 80% in butyl acetate (MPA) | 33.6 wt. % |
| | 1-methoxypropylacetate-2 | 48.8 wt. % |
| | dibutyltin dilaurate, 10% in MPA | 0.1 wt. % |
| B) | Desmodur N 75, 75% in MPA/xylene | 17.5 wt. % |
| | | 100.0 wt. % |

Formulation 2

| | | |
|---|---|---|
| A) | Impranil C, 30% in ethyl acetate | 31.9 wt. % |
| | Desmophen 670, 80% in MPA | 11.9 wt. % |
| | MPA | 48.0 wt. % |
| B) | Desmodur N 75, 75% in MPA/xylene | 8.2 wt. % |
| | | 100.0 wt. % |

Formulation 3

| | | |
|---|---|---|
| A) | Impranil C, 30% in ethyl acetate | 67.7 wt. % |
| | Desmophen 670, 80% in MPA | 6.3 wt. % |
| | MPA | 18.8 wt. % |
| B) | Desmodur N 75, 75% in MPA/xylene | 5.5 wt. % |
| | Desmodur VP LS 2010/1, 100% | 1.7 wt. % |
| | | 100.0 wt. % |

Formulation 4

| | | |
|---|---|---|
| A) | Impranil C, 30% in ethyl acetate | 45.7 wt. % |
| | Desmolac 4340, 40% in xylene/isobutanol | 11.4 wt. % |
| | MPA | 40.1 wt. % |
| B) | Desmodur N 75, 75% in MPA/xylene | 2.8 wt. % |
| | | 100.0 wt. % |

Formulation 5

| | | |
|---|---|---|
| A) | Impranil C, 30% in ethyl acetate | 48.4 wt. % |
| | Desmolac VP LS 2195/1, 40% in butylacetate/NMP | 12.1 wt. % |
| | MPA | 36.5 wt. % |
| B) | Desmodur N 75, 75% in MPA/xylene | 3.0 wt. % |
| | | 100.0 wt. % |

Formulation 6

| | | |
|---|---|---|
| A) | Impranil C, 30% in ethyl acetate | 37.6 wt. % |
| | Desmophen 1652, 100% | 11.2 wt. % |
| | MPA | 45.3 wt. % |
| B) | Desmodur VP LS 2010/1, 100% | 5.9 wt. % |
| | | 100.0 wt. % |

Formulation 7

| | | |
|---|---|---|
| A) | Impranil C, 30% in ethyl acetate | 74.0 wt. % |
| | MPA | 22.3 wt. % |
| B) | Desmodur N 75, 75% in MPA/xylene | 3.7 wt. % |
| | | 100.0 wt. % |

Formulation 8

| | | |
|---|---|---|
| A) | Bayhydrol VP LS 2244/1 | 48.7 wt. % |
| | Bayhydrol PR 240 | 48.7 wt. % |
| B) | Desmodur VP LS 2307 | 2.6 wt. % |
| | | 100.0 wt. % |

All of the products used in the formulations are available from Bayer.

Examples of Polyurethane Primer

Examples 1 to 10 of EP-A 57838 were used for the primer. The wording of Examples 1 to 10 of EP-A 57838 (U.S. Pat. No. 4,456,642, herein incorporated by reference) is as follows:

Example 1 (from EP-A 57 838)

3500 parts of a polyether based on trimethylolpropane with a hydroxyl number of 56, produced from 45% propylene oxide and 55% ethylene oxide, 700 parts of a polyether based on trimethylolpropane with a hydroxyl number of 34, produced from 83% propylene oxide and 17% ethylene oxide, and 2800 parts of a polyether based on propylene glycol with a hydroxyl number of 56, produced from 100% propylene oxide, were stirred at a temperature of 22° C. by means of a laboratory mixer equipped with a stirring disc to form a clear solution. 301 parts of a biuret polyisocyanate with an isocyanate content of 21 wt. %, a mean functionality of 3.6 and a mean molecular weight of 700, which was produced by biuretization reaction from hexamethylene diisocyanates (Desmodur N from Bayer AG) were added to this solution while stirring and thoroughly distributed. 105 parts of dibutyltin dilaurate were added to the now turbid solution and the mixture was intensively mixed for 3 minutes. The whitish turbid solution was poured into a prepared square casing of polyurethane film of film thickness 0.2 mm with an edge length of 45 cm and the film casing was sealed in an airtight manner. The thus prepared gel cushion was placed on a flat support and left for the gel reaction to take place, following which the gel cushion reached its mechanical final strength and can be fully loaded. The cushion was a soft, dimensionally stable body deformable under pressure. When the deforming force was removed, the gel cushion returned to its original state.

Under loading with an artificial seat made from plastics material and loaded with a 35 kg weight, a pressure of 44 pressure units (PU) was measured on the crosspiece and a pressure of 48 PU was measured on the seat leg projections.

Example 2 (Comparison Example from EP-A 57 838)

A foam cushion made from a commercially available polyether foam with a bulk density according to DIN 53 420 of 35 kg/m$^3$ and a compressive strength (40%) according to DIN 53 571 of 3.3 KPa, as was conventionally used for the production of cushion units and mattresses, was provided with a coating of the polyurethane film of Example 1. The cushion covered in this way was loaded as described in Example 1 with an artificial seat. A pressure of 109 PU was measured on the crosspiece and a pressure of 34 PU was measured on the seat leg projection.

Example 3 (from EP-A 57 838)

A gel-forming mixture was produced according to the procedure described in Example 1 and was poured as described into a square covering made of elastic film. However, instead of being fabricated from a 0.2 mm thick polyurethane film, the covering was fabricated from a polymer blend of 50 parts of polypropylene and 50 parts of a styrene-butadiene block copolymer.

After the gel reaction was complete, a soft, dimensionally stable gel cushion deformable under pressure was obtained, which after deformation returned to its original state when the deforming force was removed.

The gel cushion obtained in this way was loaded as described in Example 1 with an artificial seat. A pressure of 18 PU was measured on the crosspiece and a pressure of 19 PU was measured on the seat leg projections.

Example 4 (from EP-A 57 838)

A gel-forming mixture was produced according to the procedure described in Example 1 and poured as described in Example 1 into a square covering. However, instead of being fabricated from polyurethane film the covering was fabricated from an elastic textile provided with an elastic polyurethane coating, such as was generally customary and known for the manufacture of corsetry or bathwear.

After the gel reaction was complete a soft, dimensionally stable gel cushion deformable under pressure was obtained, which after deformation returned to its original state when the deforming force was removed. The gel cushion obtained in this way was loaded as described in Example 1 with an artificial seat. A pressure of 32 PU was measured on the crosspiece projection and a pressure of 28 PU on the seat leg projections.

Example 5 (from EP-A 57 838)

3500 parts of a polyether based on trimethylolpropane with a hydroxyl number of 56, produced from 45% propylene oxide and 55% ethylene oxide, 700 parts of a polyether based on trimethylolpropane with a hydroxyl number of 34, produced from 83% propylene oxide and 17% ethylene oxide, and 2800 parts of a polyether based on propylene glycol with a hydroxyl number of 56, produced from 100% propylene oxide, and 35 parts of dibutyltin dilaurate were homogeneously mixed in a stirrer vessel at 22° C. The mixture was added by means of a gear-type pump to a static mixer. 273 parts of the biuret polyisocyanate from Example 1 were added at the same time from a separate storage container to this mixer using another gear-type pump so that the mixing ratio of the two components was equal at all times and corresponds to the ratio of the total amounts.

The whitish turbid solution flowing out from the static mixer was poured into a square covering, as described in Example 4, and a gel cushion in the form of a pillow was made therefrom as described in Example 1.

After the gel reaction was complete, a soft, dimensionally stable gel cushion deformable under pressure was obtained, which after deformation returned to its original state when the deforming force was removed.

The gel cushion obtained in this way was loaded with an artificial seat as described in Example 1. The following pressure values were measured: crossleg projection 31 PU; seat leg projections 23 PU.

Example 6 (from EP-A 57 838)

1000 parts of a polyether based on trimethylolpropane with a hydroxyl number of 35, produced from 80% propylene oxide and 20% ethylene oxide, 50 parts of the biuret polyisocyanate from Example 1, and 15 parts of dibutyltin dilaurate were intensively mixed within 1 minute at room temperature using a laboratory stirrer with a stirring disc. After 10 minutes an opaque, elastic, color-stable gel was obtained which was easily deformed under the influence of a force acting thereupon and which returned to its original state after the deforming force was removed.

The gel was particularly suitable for producing gel cushions.

Example 7 (from EP-A 57 838)

1000 parts of a polyether based on sorbitol with a hydroxyl number of 46, produced from 100% propylene oxide, 25 parts of toluylene diisocyanate (80% 2,4-isomer and 20% 2,6-isomer) and 30 parts of dibutyltin dilaurate were intensively mixed within 1 minute at room temperature using a laboratory stirrer with a stirring disc. A soft, elastic, dimensionally stable gel was obtained which was easily deformed under the influence of a force acting thereupon and which returned to its original state after the deforming force was removed.

The gel was particularly suitable for producing gel cushions.

Example 8 (from EP-A 57 838)

1000 parts of a polyether from Example 7, 45 parts of 4,4'-diisocyanatodiphenylmethane that had been modified by a urethanization reaction with tripropylene glycol and had an isocyanate content of 23%, and 30 parts of dibutyltin dilaurate were reacted using a laboratory stirrer according to Example 7. A soft, elastic, dimensionally stable gel was obtained which was easily deformed under the influence of a force acting thereupon and which returned to its original state after the deforming force was removed.

The gel was suitable for producing gel cushions.

Example 9 (from EP-A 57 838)

1000 parts of a polyether based on glycerol with a hydroxyl number of 28, produced from 40% propylene oxide and 60% ethylene oxide, were reacted with 50 parts of the polyisocyanate according to Example 8 and 30 parts of dibutyltin dilaurate analogously to Example 7 to form a soft, elastic, dimensionally stable gel that can easily be deformed under the influence of a force acting thereupon and which returned to its original state after the deforming force was removed. The gel was likewise suitable for producing gel cushions.

Example 10 (from EP-A 57 838)

The example illustrates the use of plasticizers. 490 parts of a polyether based on trimethylolpropane with a hydroxyl number of 56, produced from 45% propylene oxide and 55% ethylene oxide, 480 parts of dibutyltin adipate, 30 parts of the isocyanate according to Example 1 and 15 parts of dibutyltin dilaurate were reacted according to Example 7 to form a soft, elastic, dimensionally stable gel that was easily deformed under the influence of a force acting thereupon and which returned to its original state after the deforming force was removed. The gel may also be used to produce gel cushions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating system comprising
   I) an anhydrous, gel-like, high molecular weight polyurethane composition, which may contain an active substance, comprising
      (1) 15 to 62 wt. %, based on the weight of 1) and 2), of a high molecular weight covalently crosslinked polyurethane matrix,
      (2) 38 to 85 wt. %, based on the weight of 1) and 2), of a liquid dispersing agent firmly bound in the matrix by secondary valence bonds, wherein the liquid dispersing agent contains one or more polyhydroxyl compounds having a number average molecular weight of 1000 to 12000 and an OH number of 20 to 112, wherein the dispersing agent is substantially free from hydroxyl compounds having a molecular weight below 800 and
      (3) optionally 0.1 to 100 wt. %, based on the weight of 1) and 2), of fillers, additives and/or catalysts for the polyurethane-forming reaction, wherein optionally 0.1 to 50 wt. % of the additives are active substances, and
   II) a solvent-containing, solvent-free and/or aqueous polyurethane topcoat comprising
      a) 0 to 50 wt. %, based on the total weight of the topcoat, of a polyurethane adduct,
      b) 0 to 90 wt. %, based on the total weight of the topcoat, of a flexible polyol having a $T_g$ of −100 to 25° C. and an OH content of 0 to 25 wt. %, based on the total weight of the flexible polyol and
      c) 1.7 to 60 wt. %, based on the total weight of the topcoat, of a polyisocyanate having an NCO content of 4 to 50 wt. %.

2. The coating system of claim 1 wherein polyurethane composition 1) contains 20 to 57 wt. % of polyurethane matrix 1) and 43 to 80 wt. % of liquid dispersing agent 2) and polyurethane matrix comprises the reaction product of one or more polyisocyanates and one or more polyhydroxyl compounds with a number average molecular weight of 1000 to 12000 and an OH number between 20 and 112, wherein the mathematical product of the NCO functionality of the polyiso-cyanates and OH functionality of the polyhydroxyl compounds is at least 5.2.

3. The coating system of claim 1 wherein liquid dispersing agent 2) comprises one or more polyhydroxyl compounds with a number average molecular weight of 1700 to 6000 and an OH number of 28 to 84.

4. The coating system of claim 1 wherein component 3) contains an active substances comprising a member selected from the group consisting of biocides, fragrances, colorants, detergents and washing aids, marking inks and printing inks, anti-aging agents, lubricants and antistatics, cleaning and care agents, anti-fouling agents, wood protection agents, plant nutrients, preservatives and growth regulators.

5. The coating system of claim 1 wherein the polyurethane topcoat II) comprises the reaction product of a flexible polyol b) with a Tg of −100 to 25° C. and an OH content of 0 to 25 wt. % with a polyisocyanate c) and optionally contains up to 50 wt. %, based on the total weight of the topcoat, of a non-crosslinking polyurethane adduct a).

6. The coating system of claim 1 wherein polyisocyanate c) is present in an amount of up to 40%, based on the total weight of the topcoat.

7. The coating system of claim 1 wherein flexible polyol IIb) is mixed with a polyacrylate.

8. A multilayer coating produced from the coating system of claim 1 wherein the polyurethane matrix has a layer thickness of 30 μm to 10 mm and the polyurethane topcoat has a layer thickness of 5 μm to 2 mm.

9. A process for producing the multilayer coating of claim 8 which comprises
   a) adding the polyurethane matrix to a mold by knife coating, pouring, spraying or injecting,
   b) applying the topcoat by knife coating, pouring, spraying or injecting,
   c) wherein a) and b) may be varied as follows as regards order
      i) applying the topcoat to the mold wall and then adding the primer and reacting in a closed open mold,
      ii) adding the primer and then applying the topcoat to the primer and reacting in a closed or open mold,
      iii) adding the primer and then applying the topcoat to the mold wall and reacting in a closed mold.

10. The process of claim 9 which comprises introducing a carrier material to be coated into the mold by injection, knife coating, pouring or spraying prior to steps a) and b).

11. The process of claim 9 which comprises introducing a carrier material into the mold by injection, knife coating, pouring or spraying after to steps a) and b).

* * * * *